US010613901B1

(12) United States Patent
Mehr (10) Patent No.: US 10,613,901 B1
(45) Date of Patent: Apr. 7, 2020

(54) CONTEXT-AWARE RESOURCE ALLOCATION

(71) Applicant: Amazon Technologies, Inc., Reno, NV (US)

(72) Inventor: Nima Sharifi Mehr, Vancouver, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 445 days.

(21) Appl. No.: 15/363,809

(22) Filed: Nov. 29, 2016

(51) Int. Cl.
*G06F 9/46* (2006.01)
*G06F 9/50* (2006.01)
*G06F 9/48* (2006.01)
*G06F 9/455* (2018.01)

(52) U.S. Cl.
CPC ........ *G06F 9/5011* (2013.01); *G06F 9/45533* (2013.01); *G06F 9/4881* (2013.01)

(58) Field of Classification Search
None
See application file for complete search history.

(56) References Cited

U.S. PATENT DOCUMENTS

2008/0209447 A1* 8/2008 Moore .............. G06F 8/36
719/320

* cited by examiner

*Primary Examiner* — Wissam Rashid
(74) *Attorney, Agent, or Firm* — Hogan Lovells US LLP (57) ABSTRACT

Context can be used to determine whether a virtual resource instance can be reused for a received event or request, which requires executing customer code using the instance. One or more rules can apply, which can be based upon aspects of the events, information associated with the events, or threat intelligence associated with the events. Once the context is determined, it can be determine whether any instances are available to process events for that context. The instances can include warmed instances, ready to execute the code for the event, or can be frozen instances which have state information available for loading without having to go through an initialization procedure. If no instances are available, a new instance can be initialized and used to execute the code. The number of instances available and flexibility with respect to context can vary over time and under load, among other such factors.

20 Claims, 6 Drawing Sheets

CONTEXT-AWARE RESOURCE ALLOCATION

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In some environments resources can be allocated on a task-specific basis. For security reasons, a separate resource instance can be initialized for each such task. The need to initialize a new instance for each task can be very resource intensive, however, and can introduce an amount of latency in the processing of each task.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the use of context in determining whether a virtual resource instance can be reused for a received event or request, where the event or request requires executing customer code using the instance. One or more rules can be determined by a customer that is to be used to process customer code, referred to herein as registered functions. The rules can be based upon aspects of the events, information associated with the events, or threat intelligence associated with the events, among other such options. Once the context is determined, a resource manager can determine whether any instances are available to process events for that context. The instances can include warmed instances, having the state information and configuration needed to execute the registered function for the event, or can be frozen instances which have the state information stored and available for loading but that would not have to go through an initialization procedure. If no instances are available, a new instance can be initialized and used to execute the registered function. The number of instances available can vary over time, and the flexibility to process different contexts with a particular instance can vary with load or other such factors.

Various other functions can be implemented within the various embodiments as well as discussed and suggested elsewhere herein.

Figure 1:
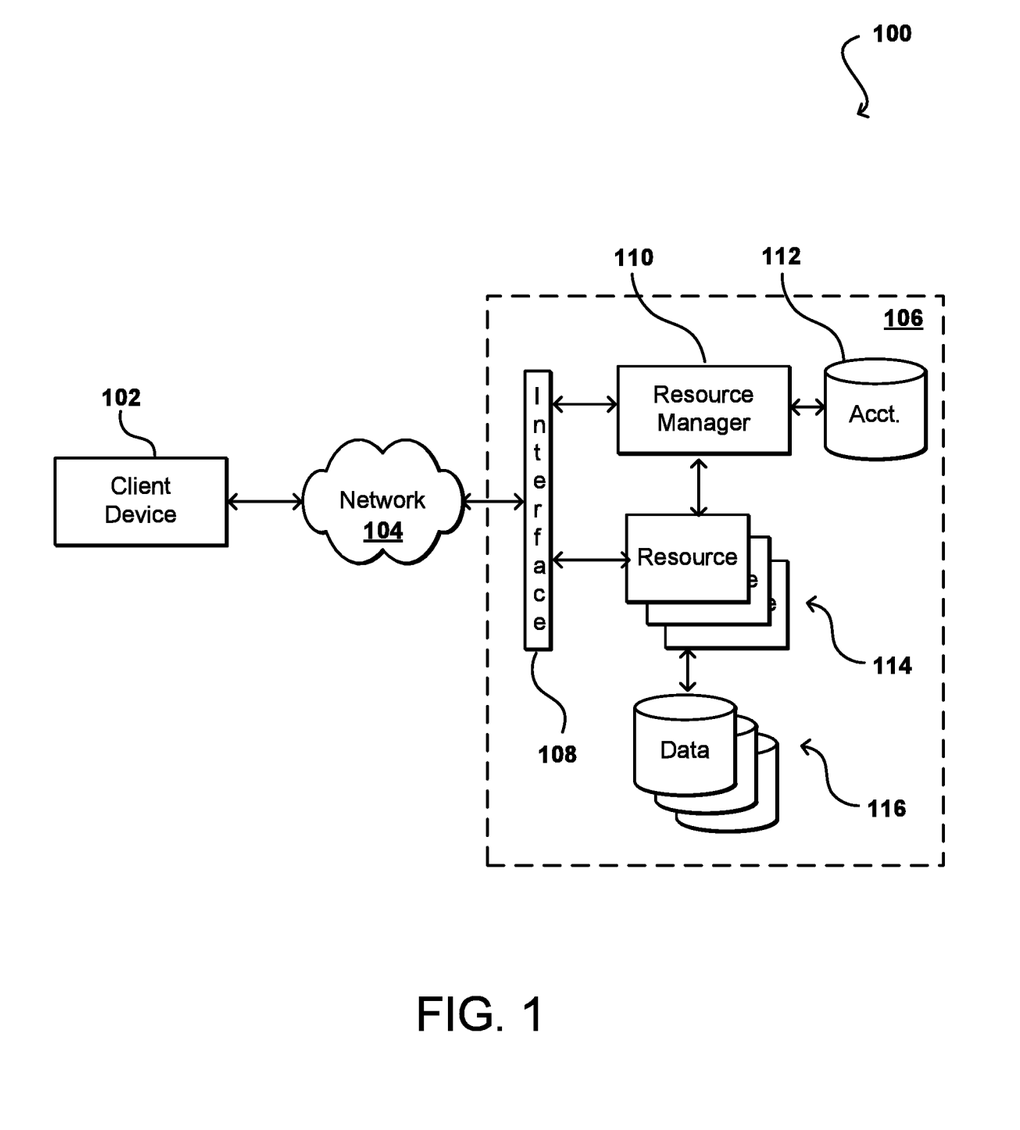
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like.

When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances or a task or event basis. A resource instance can be allocated in response to a customer request or event, and once the processing is complete that instance can either be made available for processing a different event or destroyed, among other such options. In either case, the customer will not be charged for more processing by the instance than was needed for the particular request or event.

Figure 2:
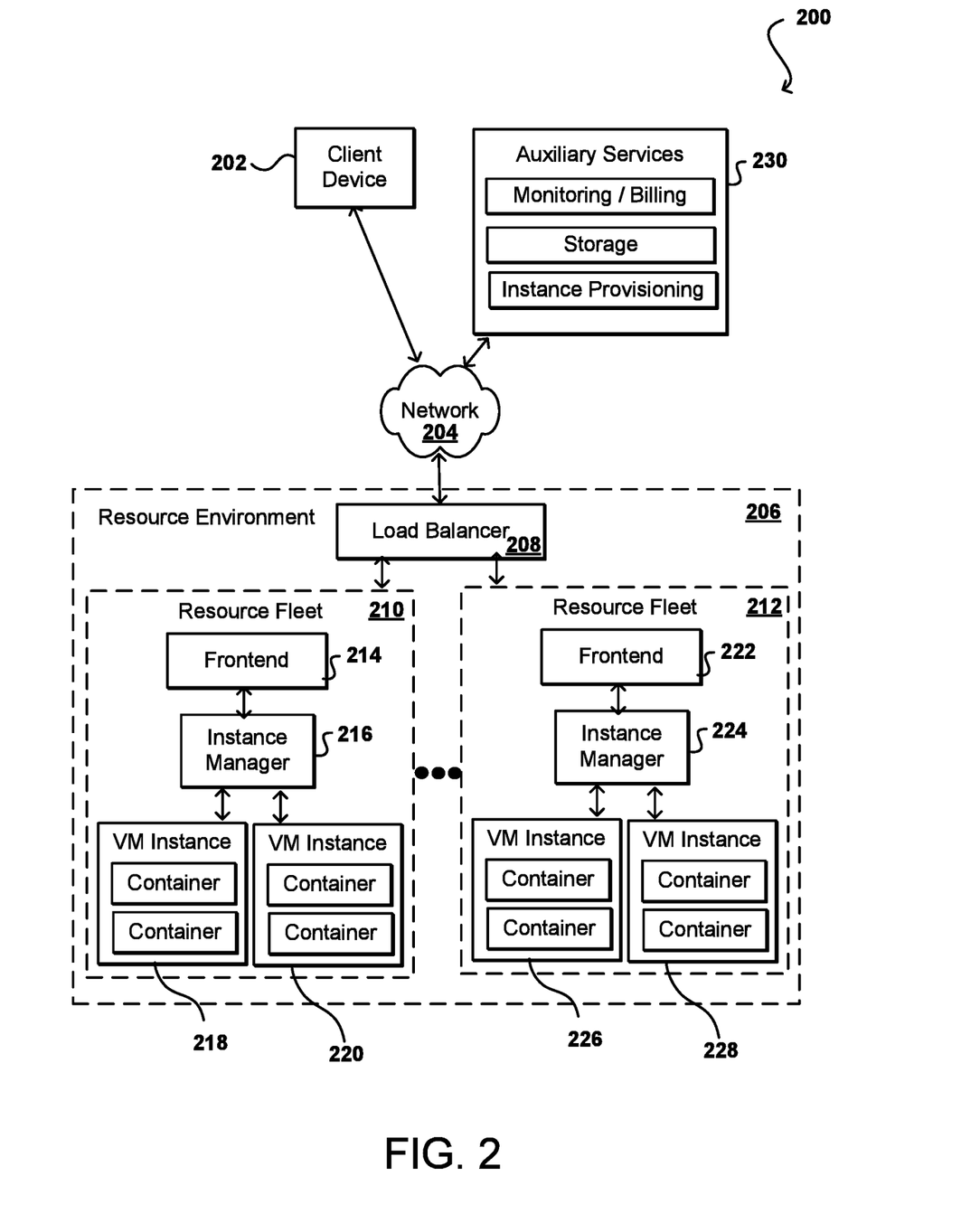
FIG. 2 illustrates an example resource environment for providing task-based resource allocation that can be used in accordance with various embodiments.

FIG. 2 illustrates components of an example environment 200 that can be used to implement such functionality. The functionality can be offered as a service, such as a Web service, in at least some embodiments, wherein a client device 202 associated with a customer can submit requests or event information over at least one network 204 to the resource environment (i.e., a resource provider environment, service provider environment, or other shared resource or multi-tenant environment). The events or requests can each be associated with specific code to be executed in the resource environment. This code can be registered with the system, and will be referred to herein as a registered function owned by the respective customer. The compute service offered by the resource environment can be referred to as a "serverless" compute service that can allocate virtual resources to execute registered functions in response to customer events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging. Customers supply the code to be executed and can be billed based on the actual amount of compute time utilized on behalf of those customers.

In some embodiments, a registered function can include the customer code as well as associated configuration information. The configuration information can include, for example, the function name and resource requirements. Registered functions can be considered to be "stateless," with no affinity to the underlying infrastructure, so that the resource managers can rapidly launch as many copies of the function as is needed to scale to the rate of incoming events. A customer providing the code for a function can specify various configuration parameters, such as the memory, timeout period, and access rules, among other such aspects. The customer in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the customer. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

Routing information for customer requests or events to execute on a virtual compute fleet (e.g., a group of virtual machine instances that may be used to service such requests) based on the frequency of execution of the user code enables high frequency user code to achieve high distribution, which can be good for fault tolerance, and enables low frequency user code to achieve high consolidation, which can be good for cost reduction.

An environment such as that described with respect to FIG. 2 can facilitate the handling of requests to execute user code on a virtual compute fleet by utilizing the containers created on the virtual machine instances as compute capacity. Information for a request or event can be received to a load balancer 208 that can determine an appropriate resource fleet 210, 212 to which to direct the information. As will be discussed in more detail later herein, the decision can be based upon various types of information, as may include the context associated with the type of event or request. Upon receiving a request to execute user code on the a selected virtual compute fleet 210, 212, a frontend service 214, 222 associated with the virtual compute fleet can provide the information to an instance manager, which can direct the information to a virtual machine (VM) instance 218, 220, 226, 228 where a container on the instance can provide an execution environment for the registered function.

The client device 202 may utilize one or more user interfaces, command-line interfaces (CLIs), application programing interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 2, the resource environment 206 is illustrated as being connected to at least one network 204. In some embodiments, any of the components within the recourse environment can communicate with other components (e.g., client computing devices 202 and auxiliary services 230, which may include monitoring/logging/billing services, storage service, an instance provisioning service, and/or other services that may communicate with components or services of the resource environment 206. In other embodiments, only certain components such as the load balancer 208 and/or the frontends 214, 222 may be connected to the network 204, and other components of the virtual resource service (i.e., components of the resource fleets) may communicate with other components of the resource environment 206 via the load balancer 208 and/or the frontends 214, 222.

Customer may use the resource fleets 210, 212 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 2, a first resource fleet 210 includes a frontend 214, an instance manager 216 (later referred to herein as a worker manager), and virtual machine instances 218, 220. Similarly, other resource fleets 212 can also include a frontend 222, an instance manager 224, and virtual machine instances 226, 228, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 208 serves as a front door to all the other services provided by the virtual compute system. The load balancer 208 processes requests to execute user code on the virtual compute system and handles the first level of load balancing across the frontends 214, 222. For example, the load balancer 208 may distribute the requests among the frontends 214, 222 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 206) prior to the request is received by the load balancer 208. The virtual compute system may vary its code execution strategy based on where the code is available at the time the request is processed.

In some embodiments, the frontend 214 for a fleet can determine that the requests are properly authorized. For example, the frontend 214 may determine whether the user associated with the request is authorized to access the customer code specified in the request. The frontend 214 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 214. The frontend 214 may also receive the request to execute such customer code when an event is detected, such as an event that the customer has registered to trigger automatic request generation. For example, the customer may have registered the customer code with an auxiliary service 230 and specified that whenever a particular event occurs (e.g., a new file is uploaded), the request to execute the customer code is sent to the frontend 214. Alternatively, the customer may have registered a timed job (e.g., execute the user code every 24 hours). In such an example, when the scheduled time arrives for the timed job, the request to execute the customer code may be sent to the frontend 214. In yet another example, the frontend 214 may have a queue of incoming code execution requests, and when the batch job for a customer is removed from the virtual compute system's work queue, the frontend 214 may process the customer request. In yet another example, the request may originate from another component within the resource environment 206 or other servers or services not illustrated in FIG. 2.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 214 can receive requests to execute customer code on the virtual compute system that have been processed by the load balancer 208. The frontend 214 can request the instance manager 216 associated with the frontend 214 of the particular fleet 210 to find compute capacity in one of the virtual machine instances 218, 220 managed by the instance manager 216. The frontend 214 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 216 manages the virtual machine instances in the respective fleet. After a request has been successfully processed by the load balancer 208 and the frontend 214, the instance manager 216 finds capacity to service the request to execute customer code on the virtual compute system. For example, if there exists a container on a particular virtual machine instance that has the user code loaded thereon, the instance manager 216 may assign the container to the request and cause the request to be executed in the container. Alternatively, if the customer code is available in the local cache of one of the virtual machine instances, the instance manager 216 may create a new container on such an instance, assign the container to the request, and cause the customer code to be loaded and executed in the container. Otherwise, the instance manager 216 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 208 or frontend 214). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 230. The data may comprise user code uploaded by one or more customers, metadata associated with such customer code, or any other data utilized by the virtual compute system to perform one or more techniques described herein. Although only the storage service is illustrated in the example of FIG. 2, the resource environment 206 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 216 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 140).

The instance manager 216 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 216 may tear down the container used to execute the user code to free up the resources it occupied to be used for other containers in the instance. Alternatively, the instance manager 216 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 216 may tear down the instance in which the container used to execute the customer code was created. Alternatively, the instance manager 216 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 230 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 216 may perform health checks on the instances and containers managed by the instance manager (e.g., an "active pool" of virtual machine instances managed by the instance manager and currently assigned to one or more customers). For example, the health checks performed by the instance manager 216 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 216 performs the health checks periodically. In some embodiments, the frequency of the health checks may be adjusted automatically based on the result of the health checks. In other embodiments, the frequency of the health checks may be adjusted based on customer requests. In some embodiments, the instance manager 216 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 214, 222 can route code-processing requests according to a method that is different than the method used by the load balancer 208 to route requests among the frontends. For example, a frontend 214 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests. Accordingly, it may be necessary to allocate new resource instances that require an initialization process to be performed in order to be able to respond to an event.

It is possible, however, that there can be resource instances that are available to respond to an event or request without having to undergo the initialization process. These may be "warmed" instances that are able to be allocated to process the function for the event, as discussed, or can be "frozen" instances that may have undergone the initialization but that have had the state information stored elsewhere such that the state information can be restored as necessary. The resource instance could have undergone the initialization process in response to an earlier event, then after some period of inactivity (or in response to another such occurrence) could have gone into a frozen state. Restoring the state of the initializations can involve tasks such as loading objects into memory, loading files onto disk, or running one or more processes, among other such options. The frozen instance, once warmed, can then skip the initialization tasks and focus on responding to the current event.

While the ability to restore frozen resource instances has performance advantages for function owners, such ability can take away at least some of the security protections against persistent computing environment contaminations. As an example, a resource instance might process a maliciously crafted request that exploits a buffer overflow vulnerability in the code and executes a process with escalated privileges in the background to access and exfiltrate sensitive data that may be contained in future requests processed by the resource instance. Restoring this instance could allow the malicious code to persist for a longer period of time and gain unauthorized access to data in more contexts.

Accordingly, approaches in accordance with various embodiments can attempt to define and utilize various event "contexts" associated with certain types of events. Customers having ownership over one or more registered functions can specify how different segments of an event, or derivations of an event, can declare an events context. Customers or service providers can also provide or define other mechanisms for determining the appropriate contexts for various types of events as well. Based at least in part upon this information, a resource allocation service can examine a triggering event, or information associated with a triggering event, and extract or determine the relevant context. Once the context for an event is determined, the service can consider restoring a frozen resource instance for processing the event, where the frozen resource instance belongs to, or is associated with, the same context. As discussed elsewhere herein, in some embodiments there may be various associated or relevant contexts for an instance based upon various factors, such as current workload or capacity. As an example, a given registered function could have been configured to launch for data events on a specified customer bucket. The function owner can potentially indicate that the first part of data object prefix (i.e., XYZ in //incoming-documents/XYZ/some-document.gz) determines the context of the function. In other embodiments the function owner (or service provider, etc.) can define or determine the appropriate context based on information derived from an event. For example, the geo-location and threat score of an event extracted from its originating IP address can be used to determine the relevant context. A threat-intelligence oriented approach can potentially be implemented transparent to a function owner in at least some embodiments, as the approach does not require any specific inputs. In other embodiments, the function owner can be given the option to select which threat intelligence sources should be used for this purpose, among other such options.

Figure 3:
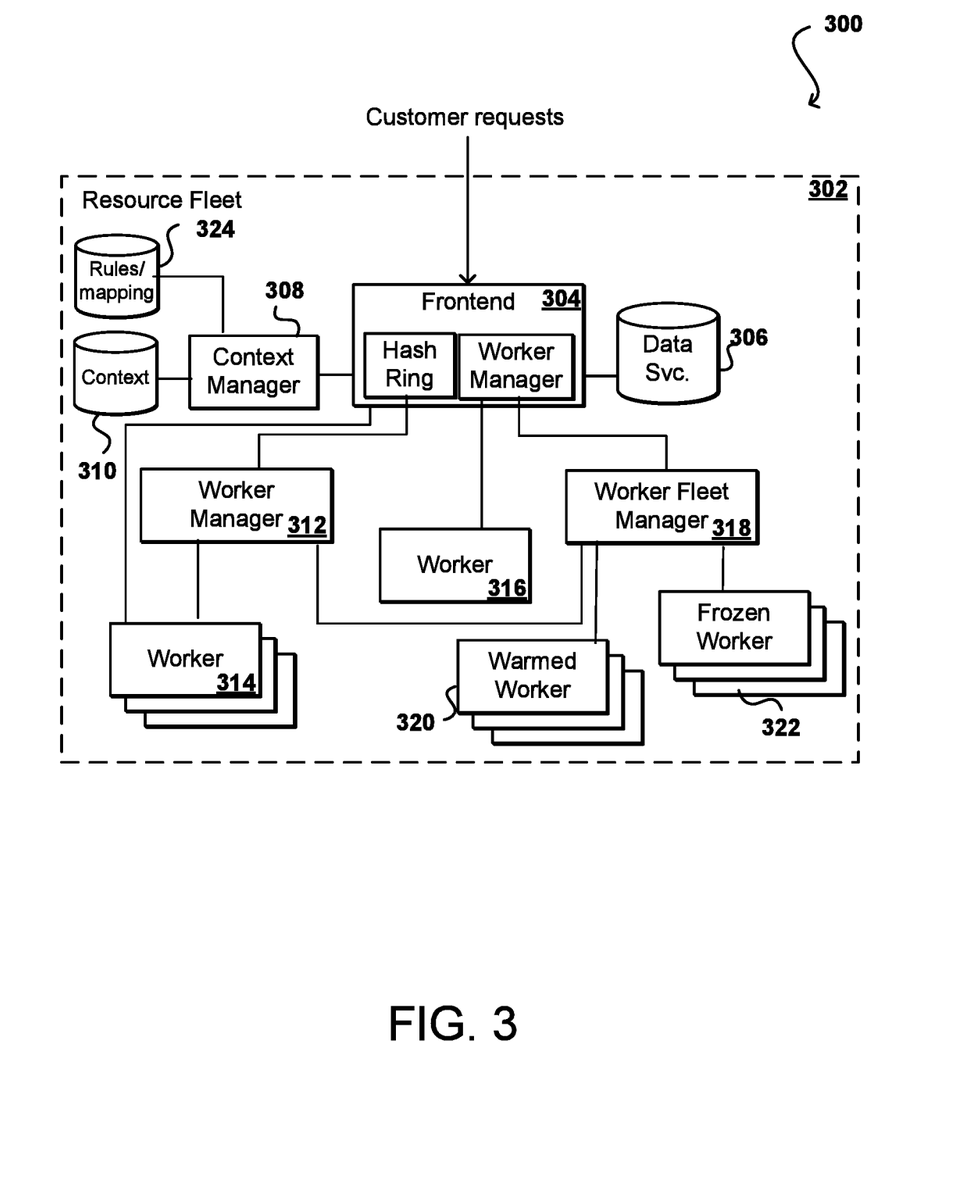
FIG. 3 illustrates an example resource fleet for managing virtual resources based at least in part upon the relevant context for a task to be performed that can be utilized in accordance with various embodiments.

FIG. 3 illustrates an example environment 300 that can be used to implement at least some of this functionality. In this example, information for customer requests or events can be directed to a resource fleet 302. The information can be directed using a load balancer and/or interface layer as discussed previously as part of a resource provider environment. In this example the resource instances will be referred to as "workers," which in various embodiments can refer to the virtual machine instances 218, 220, 226, 228 described with respect to FIG. 2. It should be understood, however, that various other types of resource instances can be utilized as workers as well within the scope of the various embodiments.

As described, a worker 314, 316 might be allocated and initialized in response to a customer event to execute a registered function. The frontend 304 can utilize one or more resource managers 312, 318 to determine whether a warmed worker 320 is available to execute the function, or whether a new worker 314 needs to be allocated and/or initialized. As mentioned, in some embodiments a worker fleet manager 318 might also determine, if a warmed worker 320 is not available, whether a frozen worker 322 is available before initializing a new worker 314 for the registered function. As mentioned, the warmed worker can have had the state information stored such that the state can be quickly restored without an initialization process in order to enable the frozen worker 322 to be warmed to execute the registered function.

It might be the case, however, that an instance allocated to execute a function might be used for instances of the same function corresponding to different types of event. This can be the case for instances that are kept warmed or otherwise available to process multiple events, or frozen instances where a snapshot of the state has been taken and stored so that the instance can be restored to the same state. The ability to reuse the instances for different types of events can be potentially dangerous in terms of processing untrusted events or documents. Various security vulnerabilities can arise when processing or parsing unknown documents of various types. There can also be third party libraries or other objects running within the environment that present security vulnerabilities. Once an instance is exposed to a security vulnerability, the reuse of that instance can expose any data for future processed events to the vulnerability. As mentioned, however, using a new instance for each event can minimize these vulnerabilities, but comes with significant overhead and latency to boot up a new instance for each event. Further, the worker managers 312, 318 would need to manage multiple copies of the same instance, which can be difficult and expensive. It thus can be desirable in at least some embodiments to reuse the same state while reducing the risk of using the same environment or the instance state for different types of events.

Accordingly, various embodiments can achieve a balance of security and expense by not allocating new resource instances or environments for each new event while also not using the same environment for all events of a given type. Various embodiments enable a customer to define how the context is declared for an incoming event. A context manager 308 can work with the frontend components 304 (or be part of the frontend in some embodiments) to determine an applicable context (if any) for an incoming event. Various context data, rules, mappings, definitions, or other information can be stored in a context repository 310 and/or rules/mapping repository 324, or otherwise made accessible to the context manager 308. As mentioned, a customer can define the context to be used for a type of event based upon part of the event, such as a specific part of the prefix for the event. Any resource instance that has processed events for that context (or type of context) and is available can be used for the event. Otherwise, the frontend 304 can direct a worker manager 312 to initialize a new worker 314 to execute the function for the event. If an environment, or sub-environment, is allocated to process events of that type, then the new worker can be launched within that environment. As mentioned, in some embodiments the context can also be determined or defined based at least in part upon information in, or associated with, the event itself. For example, the context can be determined by a type of document (e.g., text, PDF, or .doc) or data object to be processed, or derived from a reference to that document or object. Information such as the size of the object, type of encoding used, uploading user agent, or metadata defined for the object can be used to determine the context as well. In some embodiments, a given worker might be able to process any text document, but not be able to process a PDF document, etc. Other information used to determine the context can include the source of the event or document, a location of the object or document, and the like. In some embodiments a customer can provide a registered function that can determine the context for other registered functions. The context can also be determined based at least in part upon a combination of any or all of these options, among other such options.

Various embodiments can also implement a type of transparent context determination. As an example, the context manager 308 can determine (independently or in conjunction with another service) a threat score for each event, as may be based upon various threat intelligence sources. The context manager can determine the IP address associated with the request or event, and perform a lookup or other operation to determine whether the IP address has been determined to correspond to a malicious address, botnet, proxy, or other potential threat. The Various other potential threats can be determined for an event as well, such as an unknown IP address, unknown type of object, and the like.

The threat information also can include information about the average determined threat level for an event, a range of anticipated threat levels, a number of occurrences of threats with a specific type of event, a value of the objects or resources that might be impacted, and the like. Each of these types of information can have an associated score, value, or ranking, and these scores can be added, averaged, or otherwise combined to generate an overall threat score for the event. For objects with certain threat types, or threat scores above a determined threshold or value, for example, any processing can be performed by resource instances that are new instances initialized to process the respective events and then destroyed after the processing has completed, where each of those instances only processes a single, specific event. The event corresponding to the threat will lose the performance benefit of a warmed instance, but the overall security of the environment will be increased. If there is no threat identified, or if the threat is below the same or a different threshold or value, then a warmed instance can be utilized for the event. Risk intelligence for the source of the event or document can also be used as well, among other such options. In at least some embodiment a customer can select which threat intelligence sources or values they want to use, and configure their context rules or expressions accordingly. In some embodiments a customer can define a custom format, such as may be derived from a Python script or other such source. The script can be executed to determine the appropriate context. The customer can also have the ability to determine which factors are used to determine the type of context, and thus the types of events for which an instance can be reused. In some embodiments the inputs can be combined into a hash used by the frontend 304 and/or context manager 308 as the context identifier.

Figure 4:
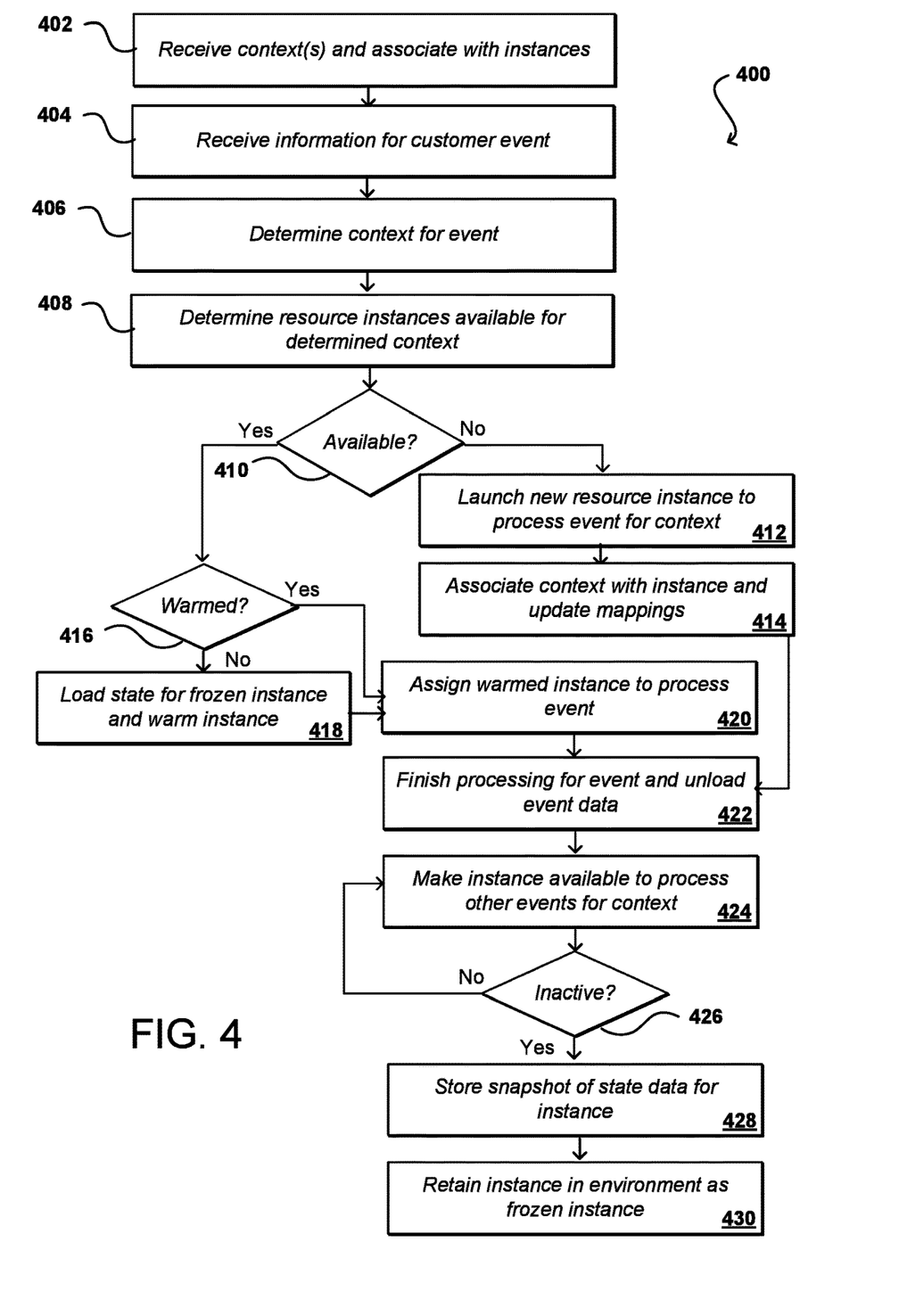
FIG. 4 illustrates an example process for processing customer events that can be utilized in accordance with various embodiments.

FIG. 4 illustrates an example process 400 for determining whether to reuse a worker for a determined context that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, context data is received 402 from a customer, or other authorized source, and associated with one or more instances allocated to execute the corresponding registered function(s). Subsequently, information for a customer event is received 404, whether as part of a customer request or in response to an event detected by the resource instance service or an external system as discussed herein. The information can be analyzed in order to determine 406 the appropriate context for the event. The context can be extracted from the information or determined data determined for the event, among other such options as discussed elsewhere herein. A component or service such as an instance manager can determine 408 the resource instances that are currently available for the determined context. If it is determined 410 that there are no such resource instances available to execute the registered function associated with the event and context, a new resource instance (i.e., an virtual machine or container) can be launched 412 or initialized in order to process the event for the determined context. The context can be associated 414 with the new instance and the mappings updated accordingly.

If one or more such virtual instances exist, a determination can be made 416 as to whether any of the available instances are warmed for the determined context. If so, a warmed instance can be assigned 420 or allocated to execute the registered function for the event. If no warmed instance is available, a frozen instance can be selected and the stored state data loaded 418, and other appropriate actions taken, to pre-warm the frozen instance, which can then be allocated for processing the event. The registered function for the event can be executed by the instance until it is determined that the processing for the event is finished 422, at which point the event data (or other event-specific objects, etc.) can be unloaded from the instance. Unless conditions exist where the instance is to be destroyed, as discussed elsewhere herein, the instance can be made 424 available to process other events for that particular context. A determination can be made 426 as to whether the instance has been inactive for at least a minimum or threshold period of time. If not, and if no other relevant conditions arise, the instance can continue to be available for the relevant context. Once the instance is inactive for at least a threshold period of time, a snapshot of the state data for the instance can be captured and stored 428 in an appropriate location. The instance can then be retained 430 in the environment as a frozen instance available for processing events for that context. As mentioned, conditions may arise where the instances may be destroyed as well within the scope of the various embodiments.

Figure 5:
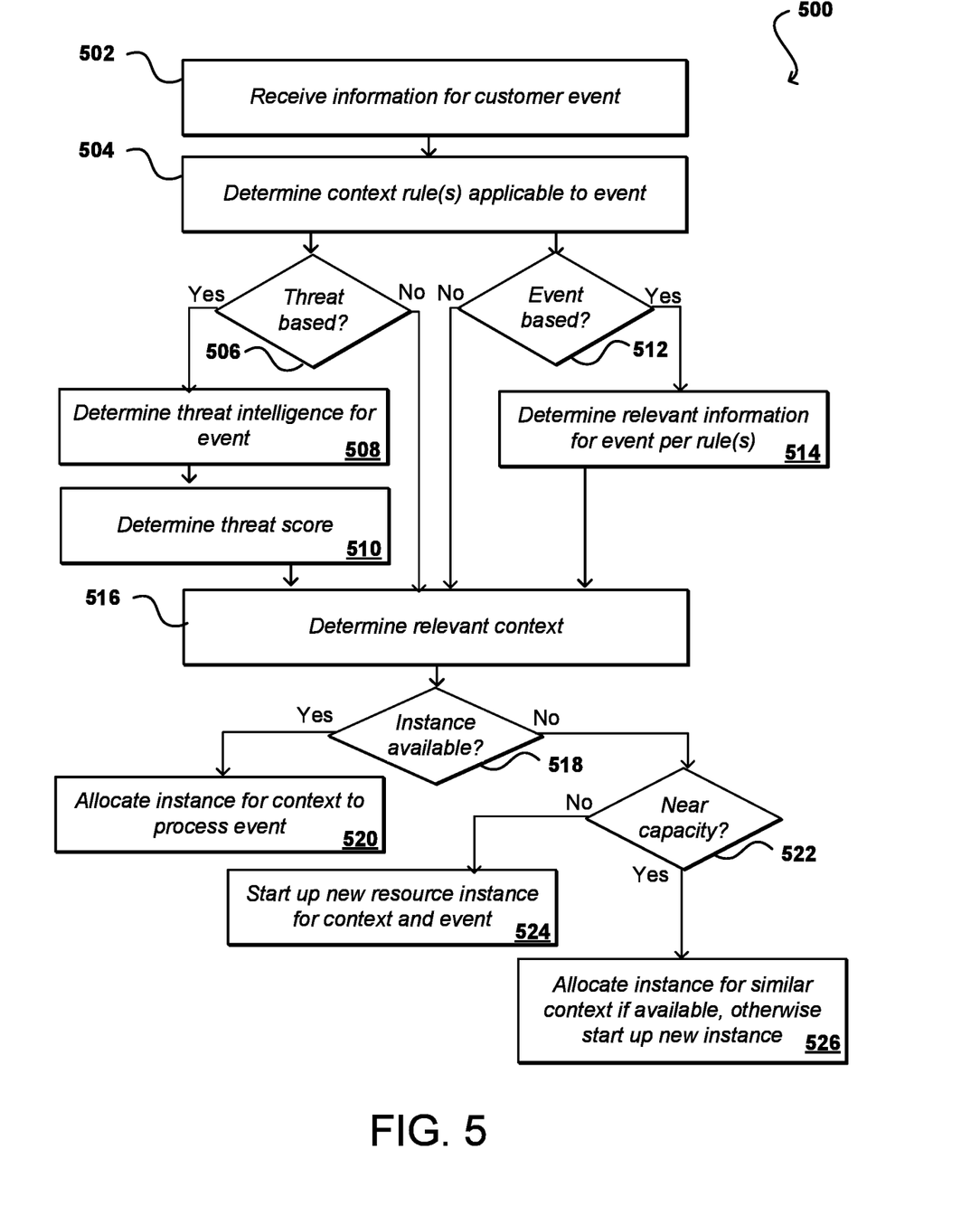
FIG. 5 illustrates an example process for determining event context that can be utilized in accordance with various embodiments.

FIG. 5 illustrates an example process 500 for determining the context for an event, and assigning relevant processing instances, that can be utilized in accordance with various embodiments. In this example, information for a customer event (or request) is received 502, such as is discussed with respect to the process of FIG. 4. In this example, a service such as a context manager can analyze information for the event to determine 504 one or more rules applicable for the event. This can include, for example, determining whether any threat-based rules or any event-based rules apply. If it is determined 506 that one or more threat-based rules applies, then the available or applicable threat intelligence for the event can be determined 508 and, in at least some embodiments, a threat score generated 510. As mentioned, in some embodiments threat information such as a source or address for an event or request may be used for the threat-based determination, while in others a score will be generated that can be compared to a value or set of context ranges, among other such options. If it is determined 512 that one or more event-based rules applies, the relevant information for the rule can be determined 514. This can include, for example, determining a prefix of the event, a context generated by another registered function, a context identifier embedded in the context, a type or size of an object to be processed, or other such information as discussed and suggested elsewhere herein. Once the appropriate threat intelligence and/or event information is obtained for the determined rule(s), the relevant context can be determined 516. Once the context is determined, a determination can be made 518, as discussed previously, as to whether an instance is available for that context. If so, the instance can be allocated 520 to process the event. If no instance is available for the determined context, another determination can be made 522 as to whether the environment is near capacity. If not, a new resource instance can be started 524 and initialized to process the event. If the environment or service is near capacity, such as operating with less than a minimum threshold amount of capacity, or at or above a current workload, then an instance can be allocated 526 that is available for a similar context. As mentioned, the level of similarity can depend at least in part upon the type of context and the amount of available capacity. If no other instances are available, or the contexts are not sufficiently similar, then a new instance can be started and initialized to process the event.

In at least some embodiments a resource service can determine the appropriate number of instances to be concurrently available based on various execution limits or other such criteria. As mentioned, this can also vary with workload or other such factors. This can include the overall number, numbers for types of contexts, numbers for specific users, and the like. As capacity decreases the number of available instances can decrease in order to free up capacity, and when capacity increases the number of available instances can increase in order to improve latency. As mentioned, the similarity for various contexts can vary with capacity as well. In some embodiments where capacity is available an instance might be able to process any event with the same (or a lower) threat intelligence score. As capacity decreases, the scores able to be processed by that instance as the system may be willing to take on more risk under heavy load. The types of allowable threat intelligence may vary as well.

Figure 6:
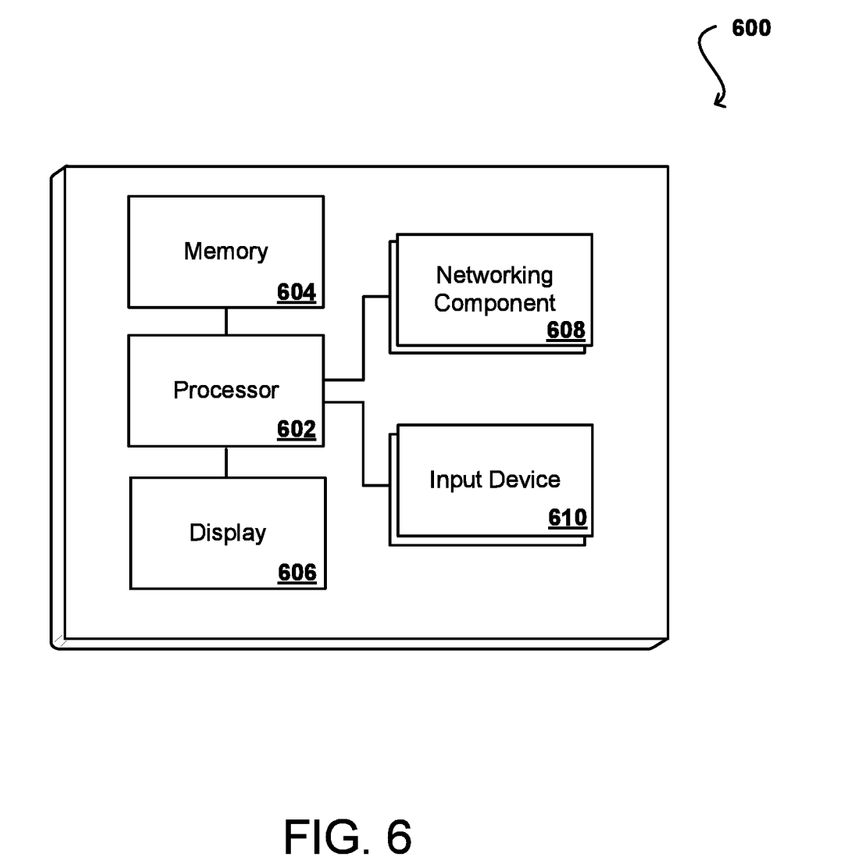
FIG. 6 illustrates example components of a computing device that can be used to implement aspects of the various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network, and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving, to a resource provider environment, customer code that is stateless and that is for execution in response to at least one type of customer event, the customer code to be executed in the resource provider environment using a plurality of virtual resources to be allocated on behalf of a customer;
    determining at least one context rule associated with the customer code, the at least one context rule being specified by the customer;
    detecting a customer event to be processed using the customer code in the resource provider environment;
    determining, using the at least one context rule and data derived from the customer event, a current context;
    determining a virtual resource, of the plurality of virtual resources and corresponding to the current context, to process the customer event;
    executing the customer code to process the event using the virtual resource; and
    deallocating the virtual resource, with respect to the customer, after executing the customer code, wherein the virtual resource is available, in the resource provider environment, for processing a subsequent event corresponding to the context.

2. The computer-implemented method of claim 1, further comprising:
    determining that the virtual resource is in a frozen state;
    loading stored state information for the virtual resource, the stored state information obtained from a prior initialization process; and
    causing the virtual resource to be able to process the customer event without undergoing a subsequent initialization process.

3. The computer-implemented method of claim 1, further comprising:
    detecting a second customer event; and
    initiating a new virtual resource to process the second customer event if an existing virtual resource is unable to be located to process the second customer event.

4. The computer-implemented method of claim 1, further comprising:
    determining threat intelligence information associated with the customer event; and
    determining, based at least in part upon the threat intelligence information and the at least one context rule, the current context.

5. The computer-implemented method of claim 1, further comprising:
    determining that a current workload in the resource provider environment at least meets a specified workload threshold;
    determining at least one context similarity criterion corresponding to the current workload; and
    determining the current context for the customer event based further in part upon the at least one context similarity criterion.

6. A computer-implemented method, comprising:
    detecting an event associated with a customer of a resource provider environment;
    determining, using at least one context rule and data derived from the event, a context corresponding to the event;
    identifying a virtual instance, available in the resource provider environment to execute a function corresponding to the event, the function being stateless and the virtual instance having previously processed a separate event corresponding to the context;
    allocating the virtual instance for execution of the function for the event on behalf of the customer;
    executing the function using the virtual instance; and
    causing the virtual instance to be deallocated with respect to the customer once execution of the function has completed.

7. The computer-implemented method of claim 6, further comprising:
    deleting any event-specific data from the virtual instance after execution of the function has completed; and
    causing the virtual instance to be available in the resource provider environment for processing a subsequent event corresponding to the context.

8. The computer-implemented method of claim 6, further comprising:
    determining that the virtual instance should remain available in the resource provider environment in a frozen state;
    capturing a snapshot of state information for the virtual instance; and
    storing the state information to a specified location in the resource provider environment, wherein the state information is able to be restored to the virtual instance to enable the virtual instance to be ready to process a subsequent event corresponding to the context without undergoing another initialization procedure.

9. The computer-implemented method of claim 6, further comprising:
    determining that the virtual resource is in a frozen state;
    loading stored state information for the virtual resource, the stored state information obtained from a prior initialization process; and
    causing the virtual resource to be ready to process the customer event without undergoing another initialization procedure.

10. The computer-implemented method of claim 6, further comprising:
    receiving at least one of a selection, specification, or providing of the at least one context rule from the customer.

11. The computer-implemented method of claim 6, wherein the data derived from the event includes at least one of a prefix, an event source, an event address, an event type, a type of object to be processed, encoding for the object to be processed, a reference in the object to be processed, a size of the object to be processed, or a location of the object to be processed.

12. The computer-implemented method of claim 6, further comprising:
    determining threat intelligence information associated with the event; and
    determining, based at least in part upon the threat intelligence information and the at least one context rule, the current context.

13. The computer-implemented method of claim 12, further comprising:
    determining a threat score based at least in part upon the threat intelligence information; and determining the context based at least in part upon the threat score, wherein a context rule for the context is capable of specifying a maximum threat score for the context.

14. The computer-implemented method of claim 13, further comprising:
destroying the virtual instance after execution of the function has completed if the threat score exceeds a determined threat score threshold.

15. The computer-implemented method of claim 6, wherein the virtual instance includes one of a plurality of containers available on a virtual machine executing in the resource provider environment.

16. A system, comprising:
at least one processor; and
memory including instructions that, when executed by the at least one processor, cause the system to:
detect an event associated with a customer of a resource provider environment;
determine, using at least one context rule and data derived from the event, a context corresponding to the event;
identify a virtual instance, available in the resource provider environment to execute a function corresponding to the event, the function being stateless and the virtual instance having previously processed a separate event corresponding to the context;
allocate the virtual instance for execution of the function for the event on behalf of the customer;
execute the function using the virtual instance; and
cause the virtual instance to be deallocated with respect to the customer once execution of the function has completed.

17. The system of claim 16, wherein the instructions when executed further cause the system to:
delete any event-specific data from the virtual instance after execution of the function has completed; and
cause the virtual instance to be available in the resource provider environment for processing a subsequent event corresponding to the context.

18. The system of claim 16, wherein the instructions when executed further cause the system to:
determine that the virtual resource is in a frozen state;
load stored state information for the virtual resource, the stored state information obtained from a prior initialization process; and
cause the virtual resource to be ready to process the customer event without undergoing another initialization procedure.

19. The system of claim 16, wherein the instructions when executed further cause the system to:
receive at least one of an executable script, expression, or path for determining the data derived from the event.

20. The system of claim 16, wherein the instructions when executed further cause the system to:
determine threat intelligence information associated with the event; and
determine, based at least in part upon the threat intelligence information and the at least one context rule, the current context.

* * * * *

UNITED STATES PATENT AND TRADEMARK OFFICE
CERTIFICATE OF CORRECTION

PATENT NO. : 10,613,901 B1
APPLICATION NO. : 15/363809
DATED : April 7, 2020
INVENTOR(S) : Nima Sharifi Mehr

Page 1 of 1

It is certified that error appears in the above-identified patent and that said Letters Patent is hereby corrected as shown below:

On the Title Page

Under item (12), Replace "Mehr" with "Sharifi Mehr"

Signed and Sealed this
Twenty-third Day of June, 2020

Andrei Iancu
*Director of the United States Patent and Trademark Office*